No. 854,260. PATENTED MAY 21, 1907.
G. C. WOODDELL.
NUT LOCK.
APPLICATION FILED NOV. 24, 1906.
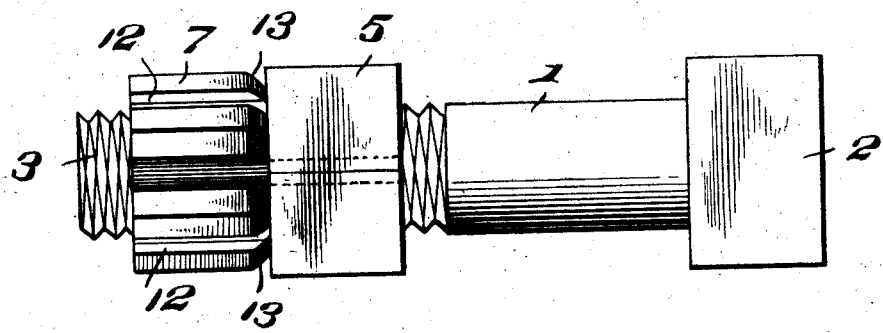
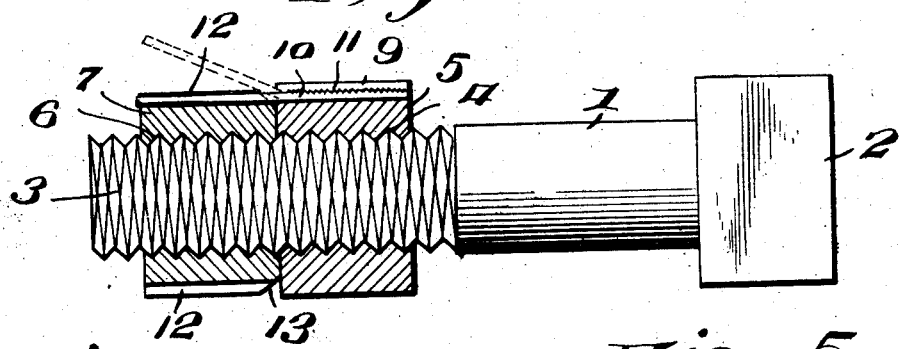
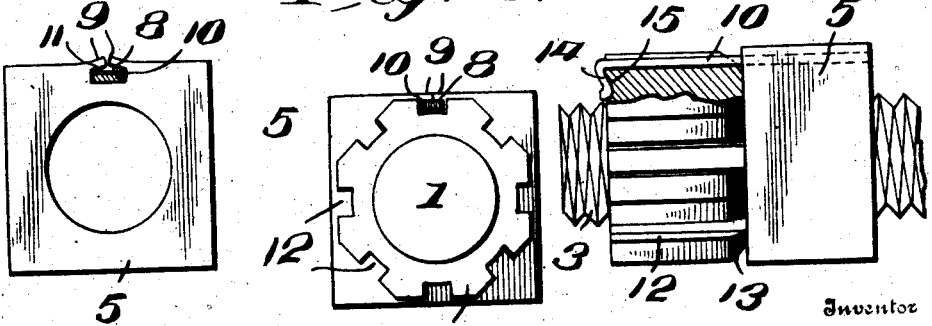
Inventor
G. C. Wooddell
Witnesses
L. W. Anderson
By W. J. FitzGerald
Attorneys

UNITED STATES PATENT OFFICE.

GROVER C. WOODDELL, OF LINWOOD, WEST VIRGINIA.

NUT-LOCK.

No. 854,260.

Specification of Letters Patent.

Patented May 21, 1907.

Application filed November 24, 1906. Serial No. 344,811.

*To all whom it may concern:*

Be it known that I, GROVER C. WOODDELL, a citizen of the United States, residing at Linwood, in the county of Pocohontas and State of West Virginia, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks, and my object is to provide a cheap and durable device of this class, whereby the binding nut will be securely locked upon the bolt and be prevented from casual removal therefrom.

A further object is to provide means upon the binding nut to engage the depressions in the locking nuts.

Other objects and advantages will be hereinafter referred to and more particularly pointed out in the claims.

In the accompanying drawings which are made a part of this application, Figure 1 is an elevation of a bolt showing my improved nut lock secured thereto. Fig. 2 is a similar view showing the nuts in section. Fig. 3 is an end elevation of the bolt and nuts secured thereto. Fig. 4 is an end elevation of the binding nut, showing my improved means for securing the locking tongue thereto, and Fig. 5 is a detail elevation partly in section of the locking nuts showing a slightly modified form of locking tongue.

Referring to the drawings in which similar reference numerals designate corresponding parts throughout the several views, 1 indicates a bolt which may be of the usual or any preferred form, and is provided at one end with a head 2, while the opposite end thereof is provided with two sets of oppositely disposed threads 3, one set of which is adapted to coöperate with threads 4 within a binding nut 5, while the opposite set of threads is adapted to engage threads 6 in a locking nut 7.

One edge of the nut 5 is provided with a channel 8, the outer wall of which is severed to form lips 9 which are adapted to be raised and spread apart as shown in Fig. 4, so that a locking bar 10 may be readily inserted into the channel 8, and after the bar has been properly seated within the channel the lips are again depressed and driven into engagement with corrugations 11 on the upper surface of the locking bar, thereby firmly seating the bar within the channel.

The periphery of the locking nut 7 is provided with a plurality of longitudinally disposed notches 12 which are disposed at regular intervals around the nut and are adapted to receive the free end of the locking bar 10, so that when the nuts have been properly turned home on the bolt, the free end of the locking bar is directed into one of the notches 12 and the two nuts securely locked together and rotation thereof upon the bolt prevented.

In disposing the nuts upon the bolt, the binding nut 5 is first introduced upon the bolt and turned home thereon, after which the locking nut is directed on to the bolt, the free end of the locking bar being elevated so as not to interfere with the turning of the locking nut, and in order to allow the locking nut to be directed against the end of the binding nut, one end of the nut is tapered or cut away, as best shown at 13 in Fig. 1, so that when the free end of the locking bar is elevated as shown by dotted lines in Fig. 2, the locking nut may be freely turned into or out of engagement with the binding nut.

In Fig. 5 of the drawing I have shown the free end of the locking bar provided with a depending tongue 14, which is adapted to be seated in a recess 15 in the end of the locking nut so that when the tongue is into engagement with said recess it will require considerable pressure to release the locking bar, so that the same may be elevated, thereby preventing any casual removal of the locking bar from the recess. It will thus be seen that by providing the bolt with right and left hand threads and employing nuts, one of which is provided with right hand threads and the other with left hand threads, that said nuts will be firmly locked together when placed upon the bolt and the locking bar disposed within one of the notches in the locking nut. It will further be seen that by introducing the corrugated end of the locking bar within the channel in the binding nut and directing the lips into engagement with said corrugations under pressure, that said locking bar will be firmly held in position on the binding nut.

What I claim is:

1. In a nut lock, a binding nut having a channel therein, and lips adapted to form one wall of said channel, a locking bar, one end of which is adapted to enter said channel, corrugations on said locking bar adapted to engage said lips when directed together under pressure and fix the locking bar with the binding nut, and a locking nut having a plurality of notches around its periphery adapted to receive the free end of said locking bar and secure the nuts together.

2. In a nut lock, the combination with a binding nut having a channel therein; a locking nut, the inner end of which is tapered, a locking bar, one end of which is adapted to engage the notches in the locking nut and the opposite end thereof to enter the channel in the binding nut, and means to rigidly secure said locking bar in the channel.

3. The combination with a binding nut and a locking nut therefor; of a locking bar, one end of which is secured to said binding nut and the opposite end thereof directed into notches formed on the periphery of said binding nut, and a depending tongue at the free end of said locking bar adapted to engage recesses in the end of the locking nut and hold said bar into engagement with said notches said locking nut having its inner end tapered whereby the locking bar may be released from the notches in the locking nut without disengaging the same from the channel in the binding nut.

In testimony whereof I have signed my name to this specification in the presence of two subscribing witnesses.

GROVER C. WOODDELL.

Witnesses:
S. L. BROWN,
W. A. ESKRIDGE.